US007051149B2

(12) United States Patent
Wang et al.

(10) Patent No.: US 7,051,149 B2
(45) Date of Patent: May 23, 2006

(54) METHOD FOR TRANSCEIVING NON-USB DEVICE BY AN ADAPTER AND APPARATUS USING THE SAME

(75) Inventors: Chin Ping Wang, Hsintien (TW); Ken Chen, Taipei Hsien (TW)

(73) Assignee: Lite-on Technology Corporation, Taipei (TW)

( * ) Notice: Subject to any disclaimer, the term of this patent is extended or adjusted under 35 U.S.C. 154(b) by 227 days.

(21) Appl. No.: 10/230,343

(22) Filed: Aug. 29, 2002

(65) Prior Publication Data

US 2004/0044807 A1     Mar. 4, 2004

(51) Int. Cl.
*G06F 13/36* (2006.01)

(52) U.S. Cl. .................... 710/315; 710/313; 710/62

(58) Field of Classification Search ............ 710/62, 710/63, 64, 71, 72, 73, 315, 8, 104–105, 710/305–306, 313
See application file for complete search history.

(56) References Cited

U.S. PATENT DOCUMENTS

| 5,935,224 | A | * | 8/1999 | Svancarek et al. ............ 710/63 |
| 5,991,546 | A | * | 11/1999 | Chan et al. ..................... 710/62 |
| 6,011,486 | A | * | 1/2000 | Casey ........................ 340/7.29 |
| 6,098,130 | A | * | 8/2000 | Wang .......................... 710/100 |
| 6,119,195 | A | * | 9/2000 | Ellis et al. ................... 710/310 |
| 6,131,125 | A | * | 10/2000 | Rostoker et al. ............ 709/250 |
| 6,131,134 | A | * | 10/2000 | Huang et al. ................ 710/302 |
| 6,233,640 | B1 | * | 5/2001 | Luke et al. .................. 710/315 |
| 6,615,287 | B1 | * | 9/2003 | Behrens et al. ................ 710/8 |
| 2001/0003197 | A1 | * | 6/2001 | Matsushima et al. ......... 710/64 |

OTHER PUBLICATIONS

"Device Class Definition for Human Interface Devices (HID)"; Version 1.11; Jun. 27, 2001.*
Phillips Semiconductors; "USB Keyboard mouse using PDIUSD11"; Phillips Semiconductors; Dec. 2, 1998.*
Microhip; "PICDEM™ USB User's Guide"; Microchip; 2001.*

* cited by examiner

*Primary Examiner*—Paul R. Myers
*Assistant Examiner*—Ryan M. Stiglic
(74) *Attorney, Agent, or Firm*—Birch Stewart Kolasch & Birch LLP

(57) ABSTRACT

A method for transceiving non-USB peripheral device by an adapter and the adapter providing adaptation to an USB interface for the non-USB peripheral device, is disclosed. The adapter can read a capability report from the peripheral device and then converts the capability report to an USB-related report for facilitating accessing of the peripheral device. The adapter utilizes control commands and parameter set pre-defined by the adapter and the peripheral device to successfully access the peripheral device. The peripheral device has vendor identification (VID) and product identification (PID) and the controller transceives or detects the peripheral device with reference to the information of VID and PID.

9 Claims, 3 Drawing Sheets

METHOD FOR TRANSCEIVING NON-USB DEVICE BY AN ADAPTER AND APPARATUS USING THE SAME

FIELD OF THE INVENTION

The present invention relates to a method for transceiving non-USB device by an adapter and apparatus using the same, especially to a method for providing adaptation to USB interface for the non-USB interface and apparatus using the same.

BACKGROUND OF THE INVENTION

Computers become more powerful and their functions become more versatile rather than merely data input tool. One of outstanding advantages of the computers is expansion ability through add-on card and I/O interfaces. For examples, the computers can be connected to peripherals such as keyboard, mouse, printer, scanner, modem, and joystick through interfaces such as PS/2, RS-232, IDE, SCSI or other interfaces. Moreover, the computer requires certain driver programs installed thereto for identifying and correctly using the peripherals.

However, as can be seen from above description, the conventional I/O interfaces are complicated for computer and generally cannot be compatible to each other. Therefore, universal serial bus (USB) interface is developed for providing interface for diverse peripherals and plug-and-play (PnP) function. Therefore, diverse peripherals can be hot plugged to the computer through the USB interface.

However, some existing peripherals still have interfaces incompatible with the USB interface and should connected to the USB interface through an adapting apparatus. Therefore, the computer can access the peripherals through the USB interface with the help of the adapting apparatus. However, the adapting apparatus generally does not have built-in USB controller and therefore lacks of the ability for reading capability report of the peripherals such that the connected peripherals have only basic functions and cannot use advanced or additional functions. Taking keyboard as an example, the non-USB keyboard has only basic keyboard function and lacks of hot key function if it is connected to the USB interface through an adapting apparatus.

As can be seen from above description, the non-USB peripherals cannot send capability report once they are connected to the USB interface with the help of an conventional adapting apparatus, and the adapting apparatus cannot read capability report from the non-USB peripherals. The complete function of the peripherals cannot be exploited.

SUMMARY OF THE INVENTION

It is an object of the present invention to provide a method for transceiving non-USB device by an adapter and peripheral device using the same. The adapter can read a capability report from the peripheral device and then converts the capability report to an USB-related report for facilitating accessing of the peripheral device.

It is another, object of the present invention to provide a method for transceiving non-USB device by an adapter and peripheral device using the same, wherein the peripheral device has ability to send USB-related report.

To achieve above object, the present invention provides a method for transceiving a peripheral with a non-USB interface by using an adapter, the peripheral being connected to a computer through the adapter, the peripheral sending a report with USB-related capability through the non-USB interface and the adapter providing adaptation to USB interface for the non-USB interface. The method has following steps: the adapter sending a control command to the peripheral; the peripheral receiving the control command from the adapter; the peripheral sending a related information to the adapter in response to the control command; the adapter receiving a parameter from the peripheral; and the adapter converting the parameter into a USB-related report and sending the USB-related capability report to the computer.

To achieve above object, the present invention provides a peripheral used with an adapter and comprising a peripheral device with a non-USB, interface and having a peripheral memory with a data bank; an adapter connected to the peripheral device and r providing adaptation to USB interface for the non-USB interface, the adapter having a controller and an adaptation memory, the adaptation memory having a message data bank.

The various objects and advantages of the present invention will be more readily understood from the following detailed description when read in conjunction with the appended drawing, in which:

DETAILED DESCRIPTION OF THE INVENTION

Figure 1:
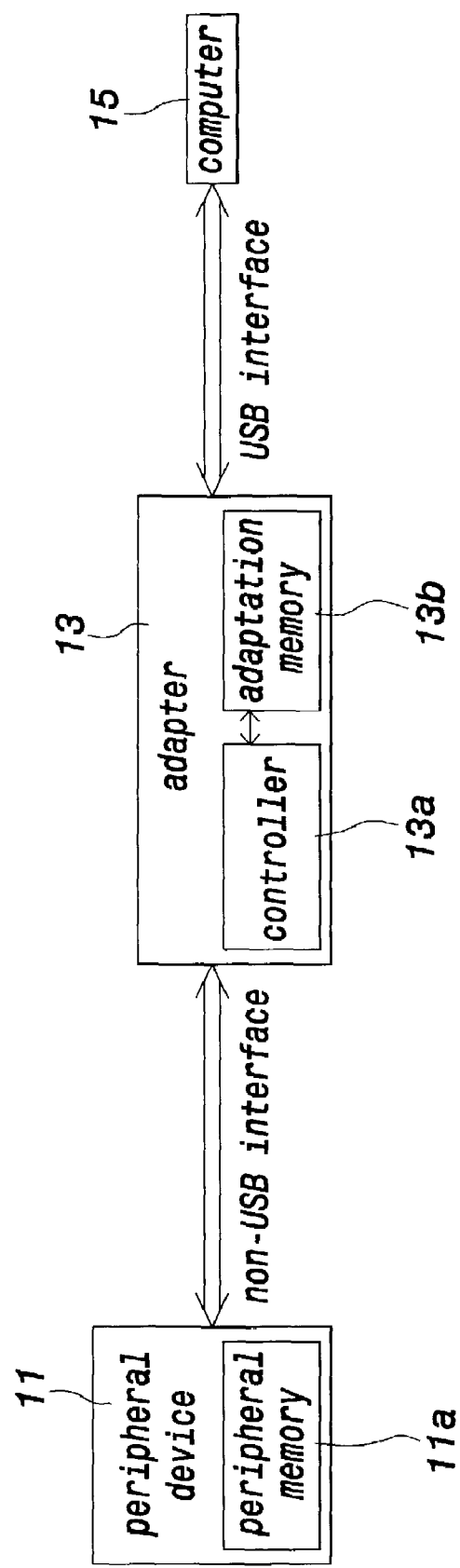
FIG. 1 shows that a non-USB peripheral is connected to a USB port of a computer through an adapter according to the present invention.

FIG. 1 shows that a non-USB peripheral device 11 is connected to a USB port of a computer 15 through an adapter 13 according to the present invention. The adapter 13 provides adaptation to USB interface such as USB 1.1 or USB 2.0 for a non-USB peripheral such as a PS/2 peripheral. The adapter 13 has a controller 13a and an adaptation memory 13b. The adaptation memory 13b has message data bank (not shown) therein for storing vendor identification (VID) and product identification (PID) of the peripheral device 11, and the controller 13a detects the peripheral device 11 with reference to the information of VID and PID. The controller 13a identifies the peripheral device 11 through messages stored in the message data bank and fetches a capability report of the peripheral device 11 by sending message command to the peripheral device 11. The capability report of the peripheral device 11 is then converted to USB-related report and then sent to the computer 15. The computer 15 installs corresponding driver and makes software setting for the peripheral device 11 according to the USB-related report.

The peripheral device 11 has a non-USB interface and is connected to the adapter 13. To provide report function in conjunction with the adapter 13, the peripheral device 11 has a built-in peripheral memory 11a with a data bank (not shown) for USB-related information. The adapter 13 has control commands and parameter pre-defined for both parties to successfully access the peripheral device 11 and the non-USB peripheral device 11 can be compatible with USB interface. When the adapter 13 is connected to the computer 15, the computer 15 can identify the peripheral device 11 by the USB-related report. Therefore, the non-USB peripheral device 11 has PnP and hot plugging property as USB device. The complete function of the peripheral device 11 can be exploited by the pre-defined control commands and parameter. For example, if the peripheral device 11 is a PS/2 keyboard the additional functions such as hot keys are still available with the help of the pre-defined control commands and parameter once the peripheral device 11 is connected to the computer 15 through the adapter 13. The peripheral memory 11a and the adaptation memory 13b can be storage, device such as ROM or RAM or EPROM or EEPROM.

Figure 2:
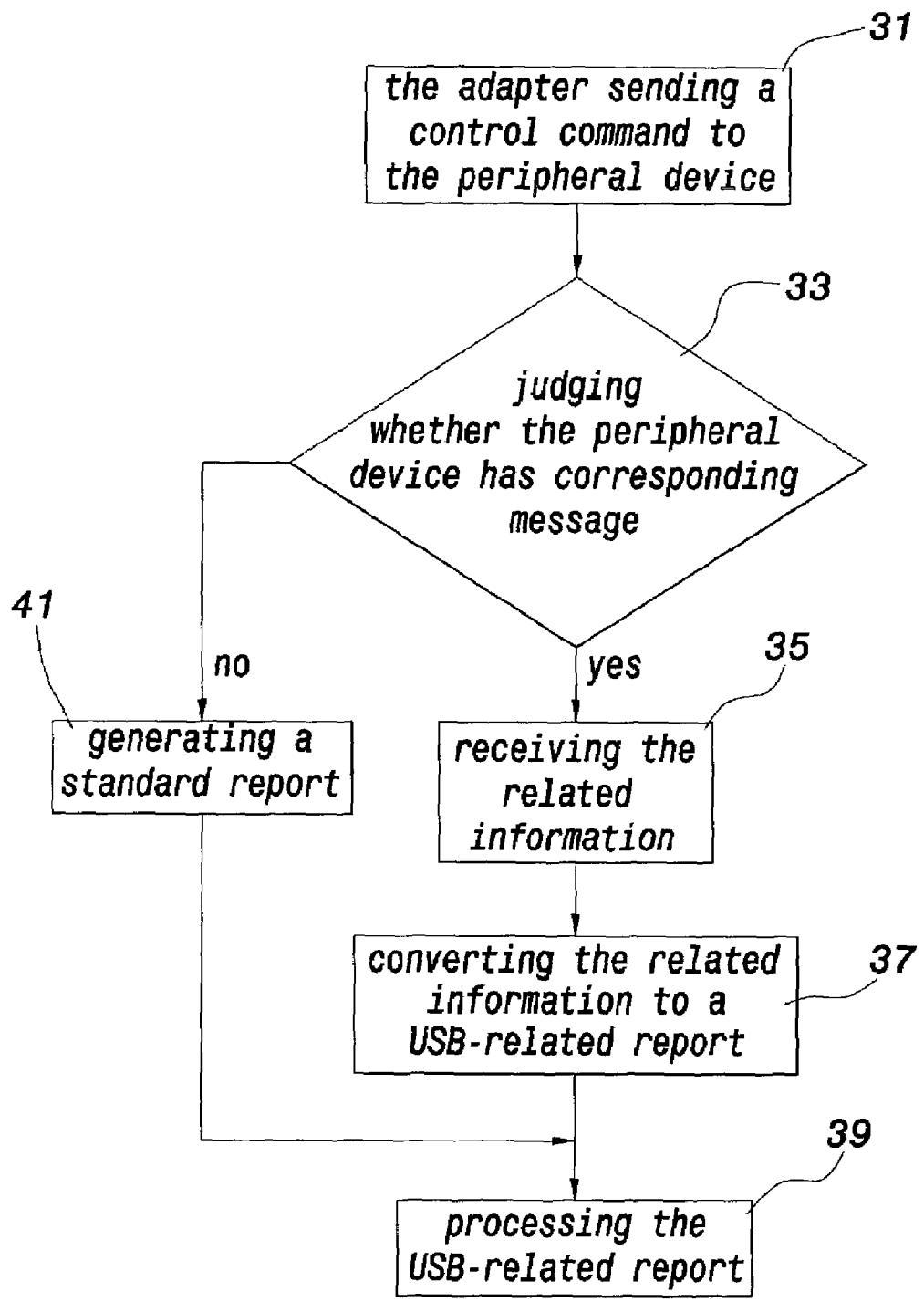
FIG. 2 shows a flowchart for the adapter according to the present invention.
Figure 3:
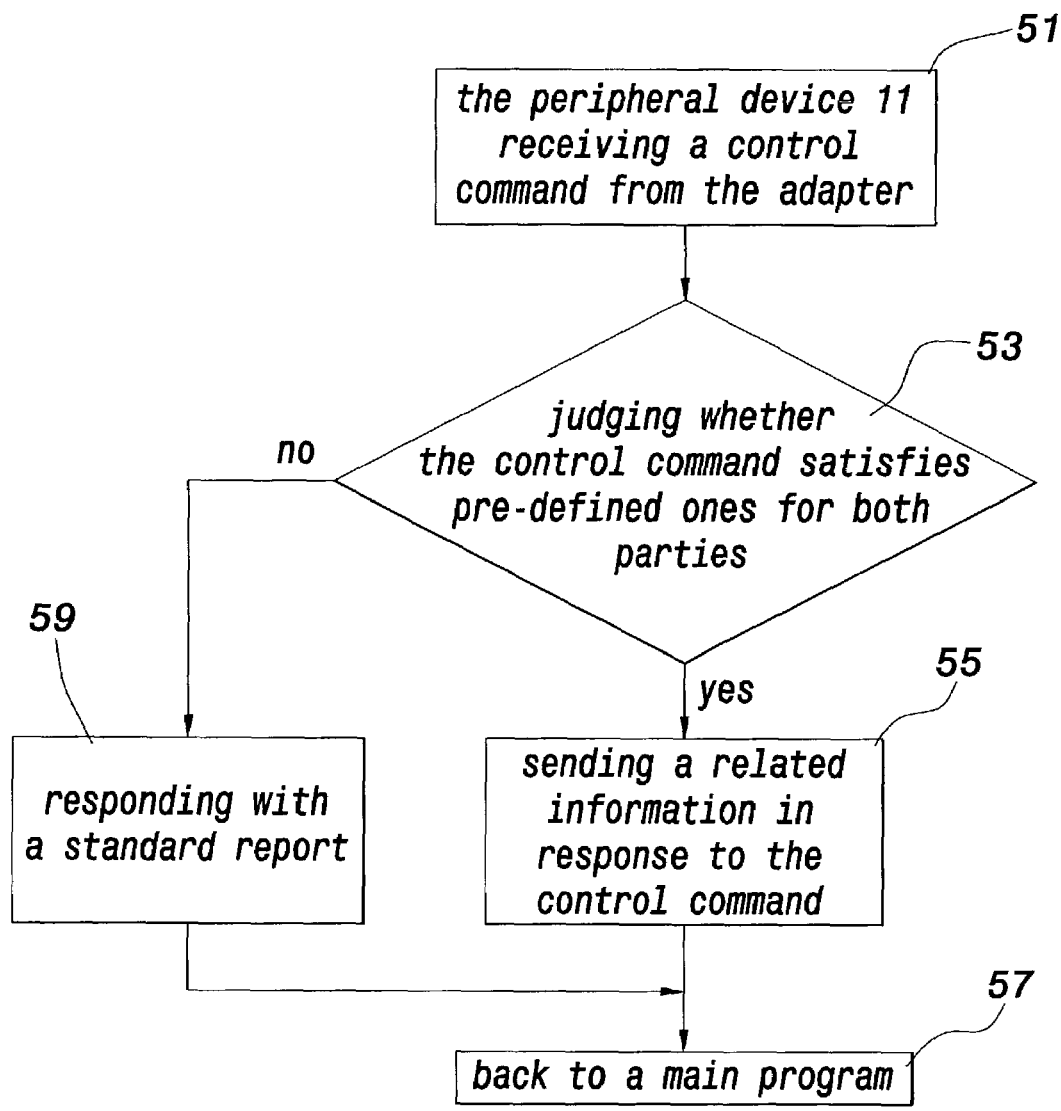
FIG. 3 shows a flowchart for the peripheral device according to the present invention.

FIGS. 2 and 3 shows a flowchart for the control flow among the peripheral device 11, the adapter 13 and the computer 15, and the flowchart comprises following steps:

step 31: the adapter 13 sending a control command to the peripheral device 11 for fetching a related information of the peripheral device 11;

step 33: judging whether the peripheral device 11 has corresponding message; if true, going to step 35; else going to step 41;

step 35: receiving the related information from the peripheral device 11;

step 37: converting the related information to a USB-related report;

step 39: processing the USB-related report and the adapter 13 sending the USB-related report to a computer 15, the computer 15 loading suitable driver program and software setting for the peripheral device 11 according to the USB-related report in order for normal operation of the peripheral device 11;

step 41: corresponding to that the peripheral device 11 has not data bank for capability report, the adapter 13 generating a standard report for the peripheral device 11 wherein a generic VID and a PID are employed. However, in this condition, the peripheral device 11 can provide ordinary function and the additional functions, such as, multimedia and internet hot keys, are not available. Afterward, the step 39 is executed.

Moreover, please refer to FIG. 3 showing a flowchart for the peripheral according to the present invention.

step 51: the peripheral device 11 receiving a control command from the adapter 13;

step 53: judging whether the control command satisfies pre-defined ones for both parties (the peripheral device 11 and the adapter 13)? if true, going to step 55, else going to step 57.

step 55: a data bank of the peripheral device 11 sending a related information in response to the control command;

step 57: back to a main program;

step 59: responding with a standard report.

More particularly, the adapter 13 has a controller 13a and an adaptation memory 13b and is used with a peripheral device 11 having a peripheral memory. The peripheral memory has a data bank for storing USB-related information. The adapter 13 and the peripheral device 11 have control commands and parameter pre-defined for both parties, whereby the adapter 13 can exploit complete function of the peripheral device 11 by sending a control command. Taking keyboard as an example, the complete function of keyboard can be exploited including the hot key function. The peripheral device 11 with reporting ability can process the pre-defined control commands and send related information to the adapter 13. The peripheral device 11 is successfully connected to a USB port of a computer 15 through the adapter 13.

To sum up, the present invention has following advantages and features:

1. The adapter can read a capability report from the peripheral and converts the capability report to a USB-related information.
2. The adapter can read a capability report from the peripheral with the help of control commands and parameter pre-defined for both parties.
3. The adapter can be used with peripheral having reporting feature and made by different manufacturers; and generates VID and PID information for USB interface connection.
4. The adapter can be used with peripheral having different capabilities, and generates USB-related information for them.
5. The peripheral has reporting capability for USB-related information.

Although the present invention has been described with reference to the preferred embodiment thereof, it will be understood that the invention is not limited to the details thereof. Various substitutions and modifications have suggested in the foregoing description, and other will occur to those of ordinary skill in the art. For example, the peripheral can also be keyboard, mouse, magnetic stripe reader (MSR), or bar code recorder with PS/2 interfaces. Moreover, the peripheral with PS/2 interfaces also have remote wake-up ability. Therefore, all such substitutions and modifications are intended to be embraced within the scope of the invention as defined in the appended claims.

We claim:

1. A method for transceiving between a peripheral device with a non-USB interface and a computer with a USB interface by using an adapter, the peripheral device being coupled to a computer through the adapter, the adapter providing adaptation to the USB interface for the non-USB interface, the method comprising the following steps of:
   sending a control command to the peripheral device by the adapter;
   when the peripheral device has a data bank,
      sending a capability report of the peripheral device from the data bank of the peripheral device in response to the control command;
      receiving the capability report of the peripheral device by the adapter; and
      converting the capability report of the peripheral device according to a message stored in a message data bank of the adaptor into a capability report compatible with the USB interface;
   when the peripheral device has no data bank, generating a standard capability report by the adaptor; and
   sending the capability report compatible with the USB interface or the standard capability report to the computer by the adapter.

2. The method as in claim 1, wherein the non-USB interface is a PS/2 interface.

3. The method as in claim 1, wherein the message stored in the message data bank are a vendor identification (VID) and a product identification (PID) of the peripheral device.

4. The method as in claim 1, wherein the control command is pre-defined by the adapter and the peripheral device.

5. A USB adaptation system, comprising
   a peripheral device with a non-USB interface having a peripheral memory with or without a data bank, the data bank storing a capability report of the peripheral device; and
   an adapter coupled to the peripheral device and for providing adaptation to an USB interface for the non- USB interface, the adapter comprising a controller and an adaptation memory, the adaptation memory having a message data bank, the adapter utilizes a control command pre-defined by the adapter and the peripheral device to access the peripheral device, the adaptor converting the capability report in the data bank according to a message stored in the message data bank into a capability report compatible with the USB interface when the peripheral device has the data bank, the adaptor generating a standard capability report when the peripheral device has no data bank, the adapter sending the capability report compatible with the USB interface or the standard capability report to a computer.

6. The USB adaptation system as in claim 5, wherein the non-USB interface is a PS/2 interface.

7. The USB adaptation system as in claim 5, wherein the message stored in the message data bank is a vendor identification (VID) and a product identification (PID) of the peripheral device.

8. The USB adaptation system as in claim 5, wherein the USB interface is selected from the group consisting of a USB 1.0 interface, a USB 1.1 interface and a USB 2.0 interface.

9. The method as in claim 4, further comprising determining whether the control command is pre-defined by one of the adapter and the peripheral device.

* * * * *